US008802743B2

(12) United States Patent
Basu et al.

(10) Patent No.: US 8,802,743 B2
(45) Date of Patent: *Aug. 12, 2014

(54) AZEOTROPE-LIKE COMPOSITIONS COMPRISING TRANS-1-CHLORO-3,3,3-TRIFLUOROPROPENE

(75) Inventors: Rajat S. Basu, East Amherst, NY (US); Kane D. Cook, Eggertsville, NY (US); Leslie Bement, Buffalo, NY (US); Gary M. Knopeck, Lakeview, NY (US); Rajiv R. Singh, Getzsville, NY (US); Ryan Hulse, Getzville, NY (US); Hang T. Pham, Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/072,881

(22) Filed: Mar. 28, 2011

(65) Prior Publication Data

US 2011/0175015 A1 Jul. 21, 2011

Related U.S. Application Data

(63) Continuation of application No. 12/259,694, filed on Oct. 28, 2008, now Pat. No. 7,935,268.

(51) Int. Cl.
 *C09K 5/04* (2006.01)
(52) U.S. Cl.
 USPC ................................ 521/99; 222/635; 252/67
(58) Field of Classification Search
 USPC ................................ 521/99; 222/635; 252/67
 See application file for complete search history.

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska et al. | |
| 2,889,379 A | 6/1959 | Ruh et al. | |
| 2,917,480 A | 12/1959 | Bailey et al. | |
| 4,465,786 A | 8/1984 | Zimmer et al. | |
| 4,798,818 A | 1/1989 | Baizer et al. | |
| 7,438,825 B1 | 10/2008 | Chen et al. | |
| 7,438,826 B1 | 10/2008 | Chen et al. | |
| 2007/0105738 A1 | 5/2007 | Nappa et al. | |
| 2007/0112231 A1 | 5/2007 | Wilmet et al. | |
| 2008/0011678 A1 | 1/2008 | Knapp | |
| 2010/0105789 A1* | 4/2010 | Van Horn et al. | 521/98 |
| 2010/0113629 A1* | 5/2010 | Van Horn et al. | 521/98 |
| 2010/0181524 A1* | 7/2010 | Elsheikh et al. | 252/78.1 |

FOREIGN PATENT DOCUMENTS

| | | |
|---|---|---|
| CN | 101248153 | 8/2008 |
| EP | 0974571 A2 | 1/2000 |
| EP | 1132365 A1 | 9/2001 |
| WO | 2008-121776 A1 | 10/2008 |
| WO | 2009/110926 A1 | 9/2009 |
| WO | WO 2009/140231 | * 11/2009 |

OTHER PUBLICATIONS

M. S. Kim et al., "A Study to Determine the Existence of an Azeotropic R-22 'Drop-In' Substitute", NISTIR 5784, US Department of Commerce, Mar. 1996.*
PCT International Search Report—PCT/US2009/062146, Filed: Oct. 27,2009 (WO).
Kim, et al., "A Study to Determine the Existence of an Azeotropic R-22 "Drop-In" Substitute," prepared by U.S. Department of Commerce for Electric Power Research Institute, Mar. 1996, pp. 1-45, U.S.
Morrison, et al., "Azeotropy in Refrigerant Mixtures," International Journal of Refrigeration, 1993, pp. 129-138, vol. 16, No. 2. U.S.
International Search Report issued Oct. 18, 2013 for EP 09829577.7. EP.

* cited by examiner

*Primary Examiner* — John Hardee
(74) *Attorney, Agent, or Firm* — Colleen D. Szuch

(57) ABSTRACT

An azeotrope-like mixture consisting essentially of chlorotrifluoropropene and at least one component selected from the group consisting of pentane, hexane, methanol, and trans-1, 2-dichloroethene.

14 Claims, No Drawings

AZEOTROPE-LIKE COMPOSITIONS COMPRISING TRANS-1-CHLORO-3,3,3-TRIFLUOROPROPENE

CROSS-REFERENCE TO RELATED APPLICATIONS

This application is a Continuation of U.S. application Ser. No. 12/259,694, filed on Oct. 28, 2008, now U.S. Pat. No. 7,935,268, issued May 3, 2011, which are incorporated herein by reference.

BACKGROUND

1. Field of Invention

The present invention relates generally to compositions comprising trans-1-chloro-3,3,3-trifluoropropene. More specifically, the present invention provides azeotrope-like compositions comprising trans-1-chloro-3,3,3-trifluoropropene and uses thereof.

2. Description of Related Art

Fluorocarbon based fluids, including chlorofluorocarbons ("CFCs") or hydrochlorofluorocarbons ("HCFCs"), have properties that are desirable in industrial refrigerants, blowing agents, heat transfer media, solvents, gaseous dielectrics, and other applications. For these applications, the use of single component fluids or azeotrope-like mixtures, i.e., those which do not substantially fractionate on boiling and evaporation, are particularly desirable.

Unfortunately, suspected environmental problems, such as global warming and ozone depletion, have been attributed to the use of some of these fluids, thereby limiting their contemporary use. Hydrofluoroolefins ("HFOs") have been proposed as possible replacements for such CFCs, HCFCs, and HFCs. However, the identification of new, environmentally-safe, non-fractionating mixtures comprising HFOs are complicated due to the fact that azeotrope formation is not readily predictable. Therefore, industry is continually seeking new HFO-based mixtures that are acceptable and environmentally safer substitutes for CFCs, HCFCs, and HFCs. This invention satisfies these needs among others.

SUMMARY OF INVENTION

Applicants have discovered that azeotrope-like compositions are formed upon mixing trans-1-chloro-3,3,3-trifluoropropene ("trans-HFO-1233zd") with a second component selected from pentane, hexane, methanol, trans-1,2-dichloroethene, and mixtures of two or more of these, and optionally nitromethane. Preferred azeotrope-like mixtures of the invention exhibit characteristics which make them particularly desirable for number of applications, including as refrigerants, as blowing agents in the manufacture of insulating foams, as solvents in a number of cleaning and other applications, including in aerosols and other sprayable compositions. In particular, applicants have recognized that these compositions tend to exhibit relatively low global warming potentials ("GWPs"), preferably less than about 1000, more preferably less than about 500, and even more preferably less than about 150.

Accordingly, one aspect of the present invention involves a composition comprising an azeotrope-like mixture consisting essentially of trans-1-chloro-3,3,3-trifluoropropene and at least one component selected from the group consisting of pentane, hexane, methanol, and trans-1,2-dichloroethene.

Another aspect of the invention provides a blowing agent comprising at least about 15 wt. % of an azeotrope-like mixture as described herein, and, optionally, co-blowing agents, fillers, vapor pressure modifiers, flame suppressants, and stabilizers.

Another aspect of the invention provides a sprayable composition comprising an azeotrope-like mixture as described herein, an active ingredient, and, optionally, inert ingredients and/or solvents and aerosol propellants.

Yet another aspect of the invention provides a closed cell foam comprising a polyurethane-, polyisocyanurate-, or phenolic-based cell wall and a cell gas comprising the novel azeotrope-like mixture as described herein.

According to another aspect of the invention, provided is a polyol premix comprising the novel azeotrope-like mixture as described herein.

According to another aspect of the invention provided, is a foamable composition comprising the novel azeotrope-like mixture as described herein.

According to another aspect of the invention provided, is a method for producing thermoset foam comprising (a) adding a blowing agent comprising a novel azeotrope-like mixture as described herein to a foamable mixture comprising a thermosetting resin; (b) reacting said foamable mixture to produce a thermoset foam; and (c) volatilizing said azeotrope-like composition during said reacting.

According to another aspect of the invention provided, is a method for producing thermoplastic foam comprising (a) adding a blowing agent comprising a novel azeotrope-like mixture as described herein to a foamable mixture comprising a thermoplastic resin; (b) reacting said foamable mixture to produce a thermoplastic foam; and (c) volatilizing said azeotrope-like composition during said reacting.

According to another aspect of the invention, provided is a thermoplastic foam having a cell wall comprising a thermoplastic polymer and a cell gas comprising a novel azeotrope-like mixture as described herein. Preferably, the thermoplastic foam comprises a cell gas having an azeotrope-like mixture consisting essentially of trans-1-chloro-3,3,3-trifluoropropene and methanol and a cell wall of a thermoplastic polymer selected from polystyrene, polyethylene, polypropylene, polyvinyl chloride, polytheyeneterephthalate or combinations thereof.

According to another aspect of the invention, provided is a thermoset foam having a cell wall comprising a thermosetting polymer and a cell gas comprising a novel azeotrope-like mixture as described herein. Preferably, the thermosetting foam comprises a cell gas having an azeotrope-like mixture consisting essentially of trans-1-chloro-3,3,3-trifluoropropene and methanol and a cell wall of a thermoset polymer selected from polyurethane, polyisocyanurate, phenolic, epoxy, or combinations thereof.

DESCRIPTION OF PREFERRED EMBODIMENTS

According to certain embodiments, the present invention provides azeotrope-like compositions comprising, and preferably consisting essentially of, trans-HFO-1233zd and at least one compound component selected from the group consisting of alcohols, hydrocarbons, chlorinated hydrocarbon and mixtures thereof, and optionally nitromethane. In certain embodiments, the novel composition comprises an azeotrope-like mixture consisting essentially of trans-HFO-1233zd and at least one component selected from the group consisting of pentane, hexane, methanol, and trans-1,2-dichloroethene. Thus, the present invention overcomes the aforementioned shortcomings by providing azeotrope-like compositions that are, in preferred embodiments, substantially free of CFCs, HCFCs, and HFCs and have very low global warming potentials have low ozone depletion, and which exhibit relatively constant boiling point and vapor pressure characteristics.

As used herein, the term "azeotrope-like" relates to compositions that are strictly azeotropic or that generally behave like azeotropic mixtures. An azeotropic mixture is a system of two or more components in which the liquid composition and vapor composition are equal at the stated pressure and temperature. In practice, this means that the components of an azeotropic mixture are constant-boiling or essentially constant-boiling and generally cannot be thermodynamically separated during a phase change. The vapor composition formed by boiling or evaporation of an azeotropic mixture is identical, or substantially identical, to the original liquid composition. Thus, the concentration of components in the liquid and vapor phases of azeotrope-like compositions change only minimally, if at all, as the composition boils or otherwise evaporates. In contrast, boiling or evaporating non-azeotropic mixtures changes the component concentrations in the liquid phase to a significant degree.

As used herein, the term "consisting essentially of", with respect to the components of an azeotrope-like composition, means the composition contains the indicated components in an azeotrope-like ratio, and may contain additional components provided that the additional components do not form new azeotrope-like systems. For example, azeotrope-like mixtures consisting essentially of two compounds are those that form binary azeotropes, which optionally may include one or more additional components, provided that the additional components do not render the mixture non-azeotropic and do not form an azeotrope with either or both of the compounds.

The term "effective amounts" as used herein refers to the amount of each component which, upon combination with the other component, results in the formation of an azeotrope-like composition of the present invention.

In preferred embodiments, the amount trans-HFO-1233zd relative to all isomers of HFO-1233zd in azeotrope-like compositions of the present invention is at least about 95%, more preferably at least about 98%, even more preferably at least about 99%, even more preferably at least about 99.9%. In certain preferred embodiments, the trans-HFO-1233zd component in azeotrope-like compositions of the present invention is essentially pure trans-HFO-1233zd.

As used herein, the term "pentane" includes all isomers of C5 alkane. Preferred pentanes include the structural isomers n-pentane ($CH_3CH_2CH_2CH_2CH_3$), isopentane (2-methylbutane), and neopentane (2,2-dimethylpropane), with n-pentane and isopentane being particularly preferred.

As used herein, the term "hexane" includes all isomers of C6 alkanes. Preferred hexanes include the structural isomers n-hexane ($CH_3CH_2CH_2CH_2CH_2CH_3$), isohexane (2-methylpentane), 3-methylpentane, 2,3-dimethylbutane, and neohexane(2,2-dimethylbutane), with isohexane being particularly preferred.

The azeotrope-like compositions of the present invention can be produced by combining effective amounts of trans-HFO-1233zd with one or more other components, preferably in fluid form. Any of a wide variety of methods known in the art for combining two or more components to form a composition can be adapted for use in the present methods. For example, trans-HFO-1233zd and methanol can be mixed, blended, or otherwise combined by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Fluoropropenes, such as $CF_3CCl=CH_2$, can be produced by known methods such as catalytic vapor phase fluorination of various saturated and unsaturated halogen-containing C3 compounds, including the method described in U.S. Pat. Nos. 2,889,379; 4,798,818 and 4,465,786, each of which is incorporated herein by reference.

EP 974,571, also incorporated herein by reference, discloses the preparation of 1,1,1,3-chlorotrifluoropropene by contacting 1,1,1,3,3-pentafluoropropane (HFC-245fa) in the vapor phase with a chromium based catalyst at elevated temperature, or in the liquid phase with an alcoholic solution of KOH, NaOH, $Ca(OH)2$ or $Mg(OH)2$. The end product is approximately 90% by weight of the trans isomer and 10% by weight cis. Preferably, the cis isomers are substantially separated from the trans forms so that the resultant preferred form of 1-chloro-3,3,3-trifluoropropene is more enriched in the trans isomer. Because the cis isomer has a boiling point of about 40° C. in contrast with the trans isomer boiling point of about 20° C., the two can easily be separated by any number of distillation methods known in the art. However, a preferred method is batch distillation. According to this method, a mixture of cis and trans 1-chloro-3,3,3-trifluoropropene is charged to the reboiler. The trans isomer is removed in the overhead leaving the cis isomer in the reboiler. The distillation can also be run in a continuous distillation where the trans isomer is removed in the overhead and the cis isomer is removed in the bottom. This distillation process can yield about 99.9+% pure trans-1-chloro-3,3,3-trifluoropropene and 99.9+% cis-1-chloro-3,3,3-trifluoropropene.

Trans-HFO-1233zd/Methanol Azeotrope-Like Compositions:

In a preferred embodiment, the azeotrope-like composition comprises effective amounts of trans-HFO-1233zd and methanol. More preferably, these binary azeotrope-like compositions consist essentially of about 70 to about 99.95 wt. % trans-HFO-1233zd and from about 0.05 to about 30 wt. % methanol, more preferably from about 90 to about 99.95 wt. % trans-HFO-1233zd and about 0.05 to about 10 wt. % methanol, and even more preferably from about 95 to about 99.95 wt. % trans-HFO-1233zd and from about 0.05 to about 5 wt. % methanol.

Preferably, the trans-HFO-1233zd/methanol compositions of the present invention have a boiling point of from about 17° C. to about 19° C., more preferably about 17° C. to about 18° C., even more preferably about 17° C. to about 17.5° C., and most preferably about 17.15° C.±1° C., all measured at a pressure of about 14 psia.

Trans-HFO-1233zd/n-Pentane Azeotrope-Like Compositions:

In a preferred embodiment, the azeotrope-like composition comprises effective amounts of trans-HFO-1233zd and n-pentane. More preferably, these binary azeotrope-like compositions consist essentially of about 65 to about 99.95 wt. % trans-HFO-1233zd and from about 0.05 to about 35 wt. % n-pentane, more preferably from about 84 to about 99.9 wt. % trans-HFO-1233zd and about 0.1 to about 16 wt. % n-pentane, and even more preferably from about 92 to about 99.5 wt. % trans-HFO-1233zd and from about 0.5 to about 8 wt. % n-pentane.

Preferably, the trans-HFO-1233zd/n-pentane compositions of the present invention have a boiling of from about 17° C. to about 19° C., more preferably about 17° C. to about 18° C., even more preferably about 17.3° C. to about 17.6° C., and most preferably about 17.4° C.±1° C., all measured at pressure of about 14 psia.

Trans-HFO-1233zd/Isopentane Azeotrope-Like Compositions:

In a preferred embodiment, the azeotrope-like composition comprises effective amounts of trans-HFO-1233zd and isopentane. More preferably, these binary azeotrope-like compositions consist essentially of about 60 to about 99.95 wt. % trans-HFO-1233zd and from about 0.05 to about 40 wt. % isopentane, more preferably from about 70 to about 95 wt. % trans-HFO-1233zd and about 5 to about 30 wt. % isopentane, and even more preferably from about 80 to about 90 wt. % trans-HFO-1233zd and from about 10 to about 20 wt. % isopentane.

Preferably, the trans-HFO-1233zd/isopentane compositions of the present invention have a boiling of from about 15° C. to about 18° C., more preferably about 16° C. to about 17° C., even more preferably about 16.7° C. to about 16.9° C., and most preferably about 16.8° C.±1° C., all measured at a pressure of about 14 psia.

Trans-HFO-1233zd/Neopentane Azeotrope-Like Compositions:

In a preferred embodiment, the azeotrope-like composition comprises effective amounts of trans-HFO-1233zd and neopentane. More preferably, these binary azeotrope-like compositions consist essentially of about 5 to about 70 wt. % trans-HFO-1233zd and from about 30 to about 95 wt. % neopentane, more preferably from about 15 to about 55 wt. % trans-HFO-1233zd and about 45 to about 85 wt. % neopentane, and even more preferably from about 20 to about 50 wt. % trans-HFO-1233zd and from about 50 to about 80 wt. % neopentane.

Preferably, the trans-HFO-1233zd/neopentane compositions of the present invention have a boiling of from about 7.7° C. to about 8.4° C., more preferably about 7.7° C. to about 8.0° C., and most preferably about 7.7° C.±1° C., all measured at a pressure of about 14 psia.

Trans-HFO-1233zd/Isohexane Azeotrope-Like Compositions:

In a preferred embodiment, the azeotrope-like composition comprises effective amounts of trans-HFO-1233zd and isohexane. More preferably, these binary azeotrope-like compositions consist essentially of about 60 to about 99.95 wt. % trans-HFO-1233zd and from about 0.05 to about 40 wt. % isohexane, more preferably from 70 wt. % to about 99.95 wt. % trans-HFO-1233zd and about 0.05 to about 30 wt. % isohexane, and even more preferably from about 80 to about 99.95 wt. % trans-HFO-1233zd and from about 0.05 to about 20 wt. % isohexane.

Preferably, the trans-HFO-1233zd/isohexane compositions of the present invention have a boiling of from about 17° C. to about 19° C., more preferably about 17° C. to about 18° C., even more preferably about 17.3° C. to about 17.6° C., and most preferably about 17.4° C.±1° C., all measured at a pressure of about 14 psia.

Trans-HFO-1233zd/trans-1,2-DCE Azeotrope-Like Compositions:

In a preferred embodiment, the azeotrope-like composition comprises effective amounts of trans-HFO-1233zd and trans-1,2-DCE. More preferably, these binary azeotrope-like compositions consist essentially of about 60 to about 99.99 wt. % trans-HFO-1233zd and from about 0.01 to about 40 wt. % trans-1,2-DCE, more preferably from about 75 to about 99.99 wt. % trans-HFO-1233zd and about 0.01 to about 25 wt. % trans-1,2-DCE, and even more preferably from about 95 weight percent to about 99.99 wt % trans-HFO-1233zd and from about 0.01 to about 5 wt. % trans-1,2-DCE.

Preferably, the trans-HFO-1233zd/trans-1,2-DCE compositions of the present invention have a boiling of from about 17° C. to about 19° C., more preferably about 17.5° C. to about 18.5° C., even more preferably about 17.5° C. to about 18° C., and most preferably about 17.8° C.±1° C., all measured at a pressure of about 14 psia.

Trans-HFO-1233zd/Methanol/n-Pentane Azeotrope-Like Compositions:

In a preferred embodiment, the azeotrope-like composition comprises effective amounts of trans-HFO-1233zd, methanol, and n-pentane. More preferably, these ternary azeotrope-like compositions consist essentially of about 55 to about 99.90 wt. % trans-HFO-1233zd, from about 0.05 to about 10 wt. % methanol, and from about 0.05 to about 35 wt. % n-pentane, even more preferably from about 79 to about 98 wt. % trans-HFO-1233zd, from about 0.1 to about 5 wt. % methanol, and about 1.9 to about 16 wt. % n-pentane, and most preferably from about 88 to about 96 wt. % trans-HFO-1233zd, from about 0.5 to about 4 wt. % methanol, and from about 3.5 to about 8 wt. % n-pentane.

Preferably, the trans-HFO-1233zd/methanol/n-pentane compositions of the present invention have a boiling point of from about 17° C. to about 19° C., more preferably about 17° C. to about 18° C., even more preferably about 17.1° C. to about 17.6° C., and most preferably about 17.4° C.±1° C., all measured at a pressure of about 14 psia.

The azeotrope-like compositions of the present invention may further include a variety of optional additives including, but not limited to, lubricants, stabilizers, metal passivators, corrosion inhibitors, flammability suppressants, and the like. Examples of suitable stabilizers include diene-based compounds, and/or phenol compounds, and/or epoxides selected from the group consisting of aromatic epoxides, alkyl epoxides, alkenyl epoxides, and combinations of two or more thereof. Preferably, these optional additives do not affect the basic azeotrope-like characteristic of the composition.

Blowing Agents:

In another embodiment of the invention, provided are blowing agents comprising at least one azeotrope-like mixture described herein. In respect to the preparation of polymer foams comprising the blowing agent described herein, and of the polymers and methods used to prepare these foams can be employed. Specifically, polymer foams are generally of two general classes, thermoplastic foams and thermoset foams.

Thermoplastic foams are produced generally via any method known in the art, including those described in Throne, Thermoplastic Foams, 1996, Sherwood Publishers, Hinkley, Ohio. or Klempner and Sendijarevic, Polymeric Foams and Foam Technology, $2^{nd}$ Edition 2004, Hander Gardner Publications. Inc, Cincinnati, Ohio. For example, extruded thermoplastic foams can be prepared by an extrusion process whereby a solution of blowing agent in molten polymer, formed in an extruded under pressure, is forced through an orifice onto a moving belt at ambient temperature or pressure or optionally at reduced pressure to aid in foam expansion. The blowing agent vaporizes and causes the polymer to expand. The polymer simultaneously expands and cools under conditions that give it enough strength to maintain dimensional stability at the time corresponding to maximum expansion. Polymers used for the production of extruded thermoplastic foams include, but are not limited to, polystyrene, polyethylene (HDPE, LDPE, and LLDPE), polypropylene, polyethylene terephthalate, ethylene vinyl acetate, and mixtures thereof. A number of additives are optionally added to the molten polymer solution to optimize foam processing and properties including, but not limited to, nucleating agents (e.g., talc), flame retardants, colorants, processing aids (e.g., waxes), cross linking agents, permeability modifiers, and the like. Additional processing steps such as irradiation to increase cross linking, lamination of a surface film to improve foam skin quality, trimming and planning to achieve foam dimension requirements, and other processes may also be included in the manufacturing process.

In general, the blowing agent may include the azeotrope-like compositions of the present invention in widely ranging amounts. It is generally preferred, however, that the blowing agents comprise at least about 15% by weight of the blowing agent. In certain preferred embodiments, the blowing agent comprises at least about 50% by weight of the present compositions, and in certain embodiments the blowing agent consists essentially of the present azeotrope-like composition. In certain preferred embodiments, the blowing agent includes, in addition to the present azeotrope-like mixtures, one or more co-blowing agents, fillers, vapor pressure modifiers, flame suppressants, stabilizers, and like adjuvants.

In certain preferred embodiments, the blowing agent is characterized as a physical (i.e., volatile) blowing agent comprising the azeotrope-like mixture of the present invention. In general, the amount of blowing agent present in the blended mixture is dictated by the desired foam densities of the final foams products and by the pressure and solubility limits of the process. For example, the proportions of blowing agent in parts by weight can fall within the range of about 1 to about 45 parts, more preferably from about 4 to about 30 parts, of blowing agent per 100 parts by weight of polymer. The blowing agent may comprise additional components mixed with the azeotrope-like composition, including chlorofluorocarbons such as trichlorofluoromethane (CFC-11), dichlorodifluoromethane (CFC-12), hydrochlorofluorocarbons such as 1,1-dichloro-1-fluoroethane (HCFC-141b), 1-chloro-1,1-difluoroethane (HCFC-142b), chlorodifluoromethane (HCFC-22), hydrofluorocarbons such as 1,1,1,2-tetrafluoroethane (HFC-134a), 1,1-difluoroethane (HFC-152a), 1,1,1,3,3-pentafluoropropane (HFC-245fa), and 1,1,1,3,3-pentafluorobutane (HFC-365mfc), hydrocarbons such as propane, butane, isobutane, cyclopentane, carbon dioxide, chlorinated hydrocarbons alcohols, ethers, ketones and mixtures thereof.

In certain embodiments, the blowing agent is characterized as a chemical blowing agents. Chemical blowing agents are materials that, when exposed to temperature and pressure conditions in the extruder, decompose to liberate a gas, generally carbon dioxide, carbon monoxide, nitrogen, hydrogen, ammonia, nitrous oxide, of mixtures thereof. The amount of chemical blowing agent present is dependent on the desired final foam density. The proportions in parts by weight of the total chemical blowing agent blend can fall within the range of from less than 1 to about 15 parts, preferably from about 1 to about 10 parts, of blowing agent per 100 parts by weight of polymer.

In certain preferred embodiments, dispersing agents, cell stabilizers, surfactants and other additives may also be incorporated into the blowing agent compositions of the present invention. Surfactants are optionally, but preferably, added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458, each of which is incorporated herein by reference. Other optional additives for the blowing agent mixture include flame retardants or suppressants such as tri(2-chloroethyl)phosphate, tri(2-chloropropyl)phosphate, tri(2,3-dibromopropyl)-phosphate, tri(1,3-dichloropropyl)phosphate, diammonium phosphate, various halogenated aromatic compounds, antimony oxide, aluminum trihydrate, polyvinyl chloride, and the like.

With respect to thermoset foams, in general any thermoset polymer can be used, including but not limited to polyurethane, polyisocyanurate, phenolic, epoxy, and combinations thereof. In general these foams are produces by bringing together chemically reactive components in the presence of one or more blowing agents, including the azeotrope-like composition of this invention and optionally other additives, including but no limited to cell stabilizers, solubility enhancers, catalysts, flame retardants, auxiliary blowing agents, inert fillers, dyes, and the like.

With respect to the preparation of polyurethane or polyisocyanurate foams using the azeotrope like compositions described in the invention, any of the methods well known in the art can be employed, see Saunders and Frisch, Volumes I and II Polyurethanes Chemistry and technology, 1962, John Wiley and Sons, New York, N.Y. In general, polyurethane or polyisocyanurate foams are prepared by combining an isocyanate, a polyol or mixture of polyols, a blowing agent or mixture of blowing agents, and other materials such as catalysts, surfactants, and optionally, flame retardants, colorants, or other additives.

It is convenient in many applications to provide the components for polyurethane or polyisocyanurate foams in preblended formulations. Most typically, the foam formulation is preblended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a third stream to the mix head or reaction site. Most conveniently, however, they are all incorporated into one B Component as described above.

Any organic polyisocyanate can be employed in polyurethane or polyisocyanurate foam synthesis inclusive of aliphatic and aromatic polyisocyanates. Preferred as a class are the aromatic polyisocyanates. Typical aliphatic polyisocyanates are alkylene diisocyanates such as tri, tetra, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like.

Preferred polyisocyanates are the polymethylene polyphenyl isocyanates, particularly the mixtures containing from about 30 to about 85 percent by weight of methylenebis (phenyl isocyanate) with the remainder of the mixture comprising the polymethylene polyphenyl polyisocyanates of functionality higher than 2.

Typical polyols used in the manufacture of polyurethane foams include, but are not limited to, aromatic amino-based polyether polyols such as those based on mixtures of 2,4- and 2,6-toluenediamine condensed with ethylene oxide and/or propylene oxide. These polyols find utility in pour-in-place molded foams. Another example is aromatic alkylamino-based polyether polyols such as those based on ethoxylated and/or propoxylated aminoethylated nonylphenol derivatives. These polyols generally find utility in spray applied polyurethane foams. Another example is sucrose-based polyols such as those based on sucrose derivatives and/or mixtures of sucrose and glycerine derivatives condensed with ethylene oxide and/or propylene oxide.

Examples of polyols used in polyurethane modified polyisocyanurate foams include, but are not limited to, aromatic polyester polyols such as those based on complex mixtures of phthalate-type or terephthalate-type esters formed from polyols such as ethylene glycol, diethylene glycol, or propylene glycol. These polyols are used in rigid laminated boardstock, can be blended with other types of polyols such as sucrose based polyols, and used in other polyurethane foam applications such as described above.

Catalysts used in the manufacture of polyurethane foams are typically tertiary amines including, but not limited to, N-alkylmorpholines, N-alkylalkanolamines, N,N-dialkylcyclohexylamines, and alkylamines where the alkyl groups are methyl, ethyl, propyl, butyl, and the like and isomeric forms thereof; and hetrocyclic amines. Typical, but not limiting examples are triethylenediamine, tetramethylethylenediamine, bis(2-dimethylaminoethyl)ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and the like, and mixtures thereof.

Optionally, non-amine polyurethane catalysts are used. Typical of such catalysts are organometallic compounds of bismuth, lead, tin, titanium, antimony, uranium, cadmium, cobalt, thorium, aluminum, mercury, zinc, nickel, cerium, molybdenum, vanadium, copper, manganese, zirconium, and the like. Included as illustrative are bismuth nitrate, lead 2-ethylhexoate, lead benzoate, ferric chloride, antimony trichloride and antimony glycolate. A preferred organo-tin class includes the stannous salts of carboxylic acids such as stannous octoate, stannous 2-ethylhexoate, stannous laurate, and the like, as well as dialkyl tin salts of carboxylic acids such as dibutyl tin diacetate, dibutyl tin dilaurate, dioctyl tin diacetate, and the like.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts and tertiary amine trimerization catalysts and alkali metal carboxylic acid salts and mixtures of the various types of catalysts. Preferred species within the classes are potassium acetate, potassium octoate, and N-(2-hydroxy-5-nonylphenol)methyl-N-methylglycinate.

Dispersing agents, cell stabilizers, and surfactants can be incorporated into the present blends. Surfactants, which are, generally, polysiloxane polyoxyalkylene block co-polymers, such as those disclosed in U.S. Pat. Nos. 2,834,748, 2,917,480, and 2,846,458, which are incorporated herein by reference.

Other optional additives for the blends can include flame retardants such as tris(2-chloroethyl)phosphate, tris(2-chloropropyl)phosphate, tris(2,3-dibromopropyl)phosphate, tris (1,3-dichloropropyl)phosphate, diammonium phosphate, various halogenated aromatic compounds, antimony oxide, aluminum trihydrate, polyvinyl chloride, and the like. Other optional ingredients can include from 0 to about 3 percent water, which chemically reacts with the isocyanate to produce carbon dioxide. This carbon dioxide acts as an auxillary blowing agent.

Also included in the mixture are blowing agents or blowing agent blends as disclosed in this invention. Generally speaking, the amount present in the blended mixture are dictated by the desired foam densities of the final polyurethane or polyisocyanurate foams produces. The proportions in parts by weight of the total blowing agent blend can fall within the range of from 1 to about 45 parts of blowing agent per 100 parts of polyol, preferably from about 4 to about 30 parts.

The polyurethane foams produced can vary in density from about 0.5 pound per cubic foot to about 40 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention is present in the A and/or B components, or alternatively added at the time the foam is prepared.

Foams and Foamable Compositions:

Certain embodiments of the present invention involve a foam comprising a polyurethane-, polyisocyanurate-, or phenolic-based cell wall and a cell gas disposed within at least a portion of the cells, wherein the cell gas comprises the azeotrope-like mixture described herein. In certain embodiments, the foams are extruded thermoplastic foams. Preferred foams have a density ranging from about 0.5 pounds per cubic foot to about 60 pounds per cubic foot, preferably from about 1.0 to 20.0 pounds per cubic foot, and most preferably from about 1.5 to 6.0 pounds per cubic foot. The foam density is a function of how much of the blowing agent or blowing agent mixture (i.e., the azeotrope-like mixture and any auxiliary blowing agent, such as carbon dioxide, chemical blowing agent or other co-blowing agent is present in the molten polymer). These foams are generally rigid but can be made in various grades of softness to suit the end use requirements. The foams can have a closed cell structure, an open cell structure or a mixture of open and closed cells, with closed cell structures being preferred. These foams are used in a variety of well known applications, including but not limited to thermal insulation, flotation, packaging, void filling, crafts and decorative, and shock absorption.

In other embodiments, the invention provides foamable compositions. The foamable compositions of the present invention generally include one or more components capable of forming foam, such as polyurethane, polyisocyanurate, and phenolic-based compositions, and a blowing agent comprising at least one azeotrope-like mixture described herein. In certain embodiments, the foamable composition comprises thermoplastic materials, particularly thermoplastic polymers and/or resins. Examples of thermoplastic foam components include polyolefins, such as polystyrene (PS), polyethylene (PE), polypropylene (PP) and polyethylene-terepthalate (PET), and foams formed therefrom, preferably low-density foams. In certain embodiments, the thermoplastic foamable composition is an extrudable composition.

In certain embodiments, provided is a method for producing such foams. It will be appreciated by those skilled in the art, especially in view of the disclosure contained herein, that the order and manner in which the blowing agent is formed and/or added to the foamable composition does not generally affect the operability of the present invention. For example, in the case of extrudable foams, it is possible to mix in advance the various components of the blowing agent. In certain embodiments, the components of the foamable composition are not mixed in advance of introduction to the extrusion equipment or are not added to the same location in the extrusion equipment. Thus, in certain embodiments it may be desired to introduce one or more components of the blowing agent at first location in the extruder, which is upstream of the place of addition of one or more other components of the blowing agent, with the expectation that the components will come together in the extruder and/or operate more effectively in this manner. In certain other embodiments, two or more components of the blowing agent are combined in advance and introduced together into the foamable composition, either directly or as part of premix which is then further added to other parts of the foamable composition.

Refrigerants and Heat Transfer Systems:

Another embodiment of the present invention relates to refrigerant compositions comprising the azeotrope-like compositions described herein. The refrigerant compositions of the present invention may be used in any of a wide variety of refrigeration systems including air-conditioning, refrigeration, heat-pump systems, and the like. In certain preferred embodiments, the compositions of the present invention are used in refrigeration systems originally designed for use with a CFC, HCFC, or HFC refrigerant, such as, for example, HFC-134a and the like. The preferred compositions of the present invention tend to exhibit many of the desirable characteristics of HFC-134a and other HFC refrigerants, including non-flammability, and a GWP that is as low as, or lower than, that of conventional HFC refrigerants. In addition, the relatively constant boiling nature of the compositions of the present invention makes them more desirable than certain conventional HFCs for use as refrigerants in many applications.

In certain embodiments, the compositions of the present invention may be used to retrofit refrigeration systems containing HFC, HCFC, and/or CFC refrigerants and lubricants used conventionally therewith, such as mineral oils, silicone oils, and the like. Preferably, the present methods involve recharging a refrigerant system that contains a refrigerant to be replaced and a lubricant, the method comprising the steps of (a) removing at least a substantial portion of the refrigerant to be replaced from the refrigeration system while retaining a substantial portion of the lubricant in said system; and (b) introducing to the system a refrigerant comprising an azeotrope-like mixture as described herein. As used herein, the term "substantial portion" refers generally to a quantity of lubricant or refrigerant which is at least about 50% (by weight) of the quantity of lubricant or refrigerant, respectively, contained in the refrigeration system prior to removal of the previous, less environmentally friendly refrigerant. Preferably, the substantial portion of lubricant or refrigerant in the system according to the present invention is a quantity of at least about 60% of the lubricant or refrigerant, respectively, contained originally in the refrigeration system, and more preferably a quantity of at least about 70%. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of known methods can be used to remove refrigerants to be replaced from a refrigeration system while removing less than a major portion of the lubricant contained in the system. For example, because refrigerants are quite volatile relative to traditional hydrocarbon-based lubricants (the boiling points of refrigerants are generally less than 10° C. whereas the boiling points of mineral oils are generally more than 200° C.), in embodiments wherein the lubricant is a hydrocarbon-based lubricant, the removal step may readily be performed by pumping refrigerants in the gaseous state out of a refrigeration system containing liquid state lubricants. Such removal can be achieved in any of a number of ways known in the art, including, the use of a refrigerant recovery system, such as the recovery system manufactured by Robinair of Ohio. Alternatively, a cooled, evacuated refrigerant container can be attached to the low pressure side of a refrigeration system such that the gaseous refrigerant is drawn into the evacuated container and removed. Moreover, a compressor may be attached to a refrigeration system to pump the refrigerant from the system to an evacuated container. Those of ordinary skill in the art also will be readily able to remove the lubricants from refrigeration systems and to provide a refrigeration system having therein a lubricant and refrigerant according to the present invention.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, are commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

Sprayable Compositions:

In a preferred embodiment, the azeotrope-like compositions of this invention may be used as solvents in sprayable compositions, either alone or in combination with other known propellants. The solvent composition comprises, more preferably consists essentially of, and, even more preferably, consists of the azeotrope-like compositions of the invention. In certain embodiments, the sprayable composition is an aerosol.

In certain preferred embodiments, provided is a sprayable composition comprising a solvent as described above, an active ingredient, and optionally, other components such as inert ingredients, solvents, and the like.

Suitable active materials to be sprayed include, without limitation, cosmetic materials such as deodorants, perfumes, hair sprays, cleaning solvents, lubricants, insecticides as well as medicinal materials, such as anti-asthma medications. The term medicinal materials is used herein in its broadest sense to include any and all materials which are, or at least are believe to be, effective in connection with therapeutic, diagnostic, pain relief, and similar treatments, and as such would include for example drugs and biologically active substances.

Solvents and Cleaning Compositions:

In another embodiment of the invention, the azeotrope-like compositions described herein can be used as a solvent in cleaning various soils such as mineral oil, rosin based fluxes, lubricants, etc., from various substrates by wiping, vapor degreasing, or other means. In certain preferred embodiments, the cleaning composition is an aerosol.

EXAMPLES

The invention is further illustrated in the following example which is intended to be illustrative, but not limiting in any manner. For examples 1-4, a ebulliometer of the general type described by Swietolslowski in his book "Ebulliometric Measurements" (Reinhold, 1945) was used.

Example 1

An ebulliometer consisting of vacuum jacketed tube with a condenser on top which was further equipped with a Quartz Thermometer was used. About 10 cc of trans-HFO-1233zd was charged to the ebulliometer and then methanol was added in small, measured increments. Temperature depression was observed when methanol was added, indicating a binary minimum boiling azeotrope had been formed. From greater than 0 to about 51 weight percent methanol, the boiling point of the composition changes less than about 1.3° C. The boiling points of the binary mixtures shown in Table 1 changed by less than about 0.02° C. Thus the compositions exhibited azeotrope and/or azeotrope-like properties over these ranges.

TABLE 1

Trans-HFO-1233zd/Methanol compositions at 14.40 psia

| Temp (° C.) | Wt. % Trans-HFO-1233zd | wt % Methanol |
|---|---|---|
| 17.15 (° C.) | 98.78 wt. % | 1.22 wt. % |
| 17.14 (° C.) | 98.58 wt. % | 1.42 wt. % |
| 17.14 (° C.) | 98.38 wt. % | 1.62 wt. % |
| 17.14 (° C.) | 98.18 wt. % | 1.82 wt. % |
| 17.14 (° C.) | 97.98 wt. % | 2.02 wt. % |
| 17.14 (° C.) | 97.78 wt. % | 2.22 wt. % |
| 17.15 (° C.) | 97.59 wt. % | 2.41 wt. % |

Example 2

An ebulliometer consisting of vacuum jacketed tube with a condenser on top which was further equipped with a Quartz Thermometer was used. About 35 g trans-HFO-1233zd is charged to the ebulliometer and then n-pentane was added in small, measured increments. Temperature depression was observed when n-pentane was added to trans-HFO-1233zd, indicating a binary minimum boiling azeotrope had been formed. From greater than 0 to about 30 weight percent n-pentane, the boiling point of the composition changes less than about 0.8° C. The boiling points of the binary mixtures shown in Table 2 changed by less than about 0.02° C. Thus the compositions exhibited azeotrope and/or azeotrope-like properties over these ranges.

TABLE 2

Trans-HFO-1233zd/n-Pentane compositions at 14.20 psia

| Temp (° C.) | Wt. % Trans-HFO-1233zd | Wt % n-pentane |
|---|---|---|
| 17.43 (° C.) | 97.76 wt. % | 2.24 wt. % |
| 17.42 (° C.) | 97.60 wt. % | 2.40 wt. % |
| 17.42 (° C.) | 97.45 wt. % | 2.55 wt. % |
| 17.42 (° C.) | 97.29 wt. % | 2.71 wt. % |
| 17.42 (° C.) | 97.14 wt. % | 2.86 wt. % |
| 17.42 (° C.) | 96.98 wt. % | 3.02 wt. % |
| 17.42 (° C.) | 96.83 wt. % | 3.17 wt. % |
| 17.42 (° C.) | 96.67 wt. % | 3.33 wt. % |
| 17.42 (° C.) | 96.52 wt. % | 3.48 wt. % |
| 17.42 (° C.) | 96.37 wt. % | 3.63 wt. % |
| 17.42 (° C.) | 96.22 wt. % | 3.78 wt. % |
| 17.42 (° C.) | 96.07 wt. % | 3.93 wt. % |
| 17.43 (° C.) | 95.92 wt. % | 4.08 wt. % |

Example 3

An ebulliometer consisting of vacuum jacketed tube with a condenser on top which was further equipped with a Quartz Thermometer was used. About 17 g trans-HFO-1233zd is charged to the ebulliometer and then isopentane was added in small, measured increments. Temperature depression was observed when isopentane was added to trans-HFO-1233zd, indicating a binary minimum boiling azeotrope had been formed. From greater than about 0 to about 30 weight percent isopentane, the boiling point of the composition changed by about 0.8° C. or less. The boiling points of the binary mixtures shown in Table 3 changed by less than about 0.2° C. Thus the compositions exhibited azeotrope and/or azeotrope-like properties over these ranges.

TABLE 3

Trans-HFO-1233/isopentane compositions at 14.39 psia

| Temp(° C.) | Wt % Trans-HFO-1233zd | Wt % isopentane |
|---|---|---|
| 16.86 (° C.) | 92.39 wt. % | 7.61 wt. % |
| 16.78 (° C.) | 90.52 wt. % | 9.48 wt. % |
| 16.73 (° C.) | 88.73 wt. % | 11.27 wt. % |
| 16.70 (° C.) | 87.01 wt. % | 12.99 wt. % |
| 16.70 (° C.) | 85.35 wt. % | 14.65 wt. % |
| 16.69 (° C.) | 83.75 wt. % | 16.25 wt. % |
| 16.70 (° C.) | 82.21 wt. % | 17.79 wt. % |
| 16.72 (° C.) | 80.73 wt. % | 19.27 wt. % |
| 16.76 (° C.) | 79.13 wt. % | 20.87 wt. % |
| 16.85 (° C.) | 77.58 wt. % | 22.42 wt. % |

Example 4

An ebulliometer consisting of vacuum jacketed tube with a condenser on top which was further equipped with a Quartz Thermometer was used. About 17 g neopentane is charged to the ebulliometer and then trans-HFO-1233zd was added in small, measured increments. Temperature depression was observed when trans-HFO-1233zd was added to, neopentane indicating a binary minimum boiling azeotrope had been formed. As shown in Table 4, compositions comprising from about 19 to about 49 weight percent trans-HFO-1233zd had a change in boiling point of 0.1° C. or less. Thus the compositions exhibited azeotrope and/or azeotrope-like properties over at least this range.

TABLE 4

Trans-HFO-1233zd/neopentane compositions at 14.2 psia

| Temp(° C.) | Wt % Trans-HFO-1233zd | Wt % neopentane |
| --- | --- | --- |
| 8.54 (° C.) | 0.00 wt. % | 100.00 wt. % |
| 8.47 (° C.) | 1.36 wt. % | 98.64 wt. % |
| 8.42 (° C.) | 2.69 wt. % | 97.31 wt. % |
| 8.30 (° C.) | 5.23 wt. % | 94.77 wt. % |
| 8.21 (° C.) | 7.65 wt. % | 92.35 wt. % |
| 8.12 (° C.) | 9.94 wt. % | 90.06 wt. % |
| 7.95 (° C.) | 14.21 wt. % | 85.79 wt. % |
| 7.87 (° C.) | 19.00 wt. % | 81.00 wt. % |
| 7.78 (° C.) | 23.29 wt. % | 76.71 wt. % |
| 7.72 (° C.) | 29.28 wt. % | 70.72 wt. % |
| 7.72 (° C.) | 34.40 wt. % | 65.60 wt. % |
| 7.75 (° C.) | 38.83 wt. % | 61.17 wt. % |
| 7.81 (° C.) | 42.70 wt. % | 57.30 wt. % |
| 7.85 (° C.) | 46.11 wt. % | 53.89 wt. % |
| 7.88 (° C.) | 49.14 wt. % | 50.86 wt. % |

Example 5

An ebulliometer consisting of vacuum jacketed tube with a condenser on top which is further equipped with a Quartz Thermometer is used. About 18 g trans-HFO-1233 is charged to the ebulliometer and then trans-1,2-DCE was added in small, measured increments. Temperature depression was observed when trans-1,2-DCE was added to trans-HFO-1233, indicating a binary minimum boiling azeotrope was formed. From greater than about 0.01 to about 53 weight percent trans-1,2-DCE, the boiling point of the composition changed by about 0.7° C. or less. The boiling points of the binary mixtures shown in Table 4 changed by less than about 0.3° C. Thus the compositions exhibited azeotrope and/or azeotrope-like properties over these ranges.

TABLE 5

Trans-HFO-1233/tr-1,2DCE compositions at 14.40 Psia

| T(° C.) | Wt. % Trans-HFO-1233zd | Wt. % tr-1,2-DCE |
| --- | --- | --- |
| 17.74 (° C.) | 100.00 wt. % | 0.00 wt. % |
| 17.74 (° C.) | 99.68 wt. % | 0.32 wt. % |
| 17.73 (° C.) | 99.35 wt. % | 0.65 wt. % |
| 17.76 (° C.) | 99.03 wt. % | 0.97 wt. % |
| 17.79 (° C.) | 98.72 wt. % | 1.28 wt. % |
| 17.82 (° C.) | 98.40 wt. % | 1.60 wt. % |
| 17.85 (° C.) | 98.08 wt. % | 1.92 wt. % |
| 17.88 (° C.) | 97.77 wt. % | 2.23 wt. % |
| 17.92 (° C.) | 97.46 wt. % | 2.54 wt. % |
| 17.96 (° C.) | 97.15 wt. % | 2.85 wt. % |

Example 6

An ebulliometer consisting of vacuum jacketed tube with a condenser on top which is further equipped with a Quartz Thermometer is used. An amount of trans-HFO-1233zd is charged to the ebulliometer and then isohexane was added in small, measured increments. Temperature depression was observed when isohexane was added to trans-HFO-1233, indicating a binary minimum boiling azeotrope was formed. From greater than about 0.01 to about 30 weight percent isohexane, the boiling point of the composition changed by about 0.5° C. or less. Thus the compositions exhibited azeotrope and/or azeotrope-like properties over these ranges.

Example 7

An ebulliometer consisting of vacuum jacketed tube with a condenser on top which was further equipped with a Quartz Thermometer was used. About 18 g of a mixture of trans-HFO-1233zd/methanol (98/2 wt %) was charged to the ebulliometer and then n-pentane was added in small, measured increments. Temperature depression was observed as n-pentane was added to trans-HFO-1233, indicating a ternary minimum boiling azeotrope was formed. From greater than about 0 to about 18 weight percent n-pentane, the boiling point of the composition changed by about 0.3° C. or less.

Example 8

An ebulliometer consisting of vacuum jacketed tube with a condenser on top which was further equipped with a Quartz Thermometer was used. About 18 g of a mixture of trans-HFO-1233zd/MeOH (98/2 wt %) was charged to the ebulliometer and then trans-1,2-DCE was added in small, measured increments. Temperature changed very little as trans-1,2-DCE was added to the mixture, indicating a ternary constant boiling azeotropic-like mixture was formed. From greater than about 0 to about 18 weight percent n-pentane, the boiling point of the composition changed by about 0.7° C. or less.

Example 9

Mixtures were prepared containing 98% by weight trans-HFO-1233zd with about 2 weight percent methanol. Several stainless steel coupons were soiled with mineral oil. Then these coupons were immersed in these solvent blends. The blends could remove the oils in a short period of time. The coupons were observed visually and looked clean.

Example 10

A solvent blend was prepared containing 98% by wt of trans-HFO-1233zd and 2% by wt of methanol. Kester 1544 Rosin Soldering Flux was placed on stainless steel coupons and heated to approximately 300-400° F., which simulates contact with a wave soldier normally used to solder electronic components in the manufacture of printed circuit boards. The coupons were then dipped in the solvent mixture and removed after 15 seconds without rinsing. Results show that the coupons appeared clean by visual inspection.

Example 11 (Prophetic)

The procedure of Example 8 is repeated except that the solvent blend is an azeotrope-like mixture of trans-HFO-1233zd and n-pentane. Visual inspection of the coupon upon removal from the solvent mixture will appear clean.

Example 12 (Prophetic)

The procedure of Example 8 is repeated except that the solvent blend is an azeotrope-like mixture of trans-HFO-1233zd and isopentane. Visual inspection of the coupon upon removal from the solvent mixture will appear clean.

Example 13 (Prophetic)

The procedure of Example 8 is repeated except that the solvent blend is an azeotrope-like mixture of trans-HFO- 1233zd and isohexane. Visual inspection of the coupon upon removal from the solvent mixture will appear clean.

Example 14 (Prophetic)

The procedure of Example 8 is repeated except that the solvent blend is an azeotrope-like mixture of trans-HFO-1233zd and trans-1,2-DCE. Visual inspection of the coupon upon removal from the solvent mixture will appear clean.

Example 15 (Prophetic)

The procedure of Example 8 is repeated except that the solvent blend is an azeotrope-like mixture of trans-HFO-1233zd, methanol, and n-pentane. Visual inspection of the coupon upon removal from the solvent mixture will appear clean.

Examples 16-22 (Prophetic)

A mixture containing 98% by weight trans-HFO-1233zd with about 2% by weight methanol is loaded into an aerosol can. An aerosol valve is crimped into place and HFC-134a is added through the valve to achieve a pressure in the can of about 20 PSIG. The mixture is then sprayed onto a metal coupon soiled with solder flux. The flux is removed and the coupon is visually clean. This procedure is repeated except that the azeotrope-like compositions of 9-13 were used instead of trans-HFO-1233zd and methanol. Similar results are obtained.

Examples 23-28 (Prophetic)

A mixture containing 98% by wt trans-HFO-1233zd and 2% by wt of methanol is prepared, silicone oil is mixed with the blend and the solvent was left to evaporate, a thin coating of silicone oil is left behind in the coupon. This indicated that the solvent blends can be used for silicone oil deposition in various substrates. This procedure is repeated except that the azeotrope-like compositions of 9-13 were used instead of trans-HFO-1233zd and methanol. Similar results are obtained.

Having thus described a few particular embodiments of the invention, various alterations, modifications, and improvements will readily occur to those skilled in the art. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A composition comprising an azeotrope-like mixture consisting essentially of trans-1-chloro-3,3,3-trifluoropropene and a compound selected from the group consisting of n-pentane, isopentane, neopentane, and isohexane.

2. The composition of claim 1 wherein said azeotrope-like mixture is a binary mixture consisting essentially of trans-1-chloro-3,3,3-trifluoropropene and a compound selected from the group consisting of n-pentane, isopentane, neopentane, and isohexane.

3. The composition of claim 1 wherein said azeotrope-like mixture consists essentially of trans-1-chloro-3,3,3-trifluoropropene and n-pentane.

4. The composition of claim 3 wherein said azeotrope-like mixture consists essentially of about 65 to about 99.95 wt. % trans-1-chloro-3,3,3-trifluoropropene and about 0.05 to about 35 wt. % n-pentane at a temperature of about 17.4±1° C. and at pressure of about 14 psia.

5. The composition of claim 1 wherein said azeotrope-like mixture further comprises nitromethane.

6. A blowing agent comprising an azeotrope-like mixture according to claim 1, and optionally, one or more compounds selected from the group consisting of co-blowing agents, fillers, vapor pressure modifiers, flame suppressants, and stabilizers.

7. A sprayable composition comprising an azeotrope-like mixture according to claim 1, an active ingredient, and, optionally, inert ingredients and/or solvents.

8. A foamable composition comprising one or more components capable of forming a foam and the composition of claim 1.

9. A closed cell foam comprising the foamable composition of claim 8.

10. A thermoplastic foam comprising the foamable composition of claim 8.

11. A thermoset foam comprising the foamable composition of claim 8.

12. A sprayable composition comprising a material to be sprayed and a propellant comprising the composition of claim 1.

13. The sprayable composition of claim 12 in the form of an aerosol.

14. The sprayable composition of claim 12 wherein the material to be sprayed is selected from the group consisting of cosmetics, cleaning solvents, lubricants, and medicinal materials.

* * * * *